United States Patent [19]

Burckhardt et al.

[11] 3,883,183

[45] May 13, 1975

[54] INSTALLATION FOR THE CONTROL OF THE BRAKE SLIPPAGE AND FOR THE PREVENTION OF THE LOCKING OF WHEELS OF VEHICLES, ESPECIALLY MOTOR VEHICLES

[75] Inventors: Manfred H. Burckhardt, Waiblingen; Hellmut Krohn, Esslingen; Horst Grossner, Geradstetten; Hans-Jörg Florus, Goppingen, all of Germany

[73] Assignee: Daimler-Benz Aktiengesellschaft, Germany

[22] Filed: Apr. 21, 1972

[21] Appl. No.: 246,276

[30] Foreign Application Priority Data

Apr. 21, 1971 Germany............................ 2119293

[52] U.S. Cl. .................................. 303/21 P; 303/20
[51] Int. Cl. ................................................. B60t 8/08
[58] Field of Search ................ 188/181; 303/20, 21; 324/162; 340/52 B, 262

[56] References Cited
UNITED STATES PATENTS

| 3,017,145 | 1/1962 | Yarber | 303/21 BE |
| 3,398,995 | 8/1968 | Martin | 303/21 BE |
| 3,467,444 | 9/1969 | Leiber | 188/181 A X |
| 3,637,264 | 1/1972 | Leiber et al. | 303/21 BE |
| 3,652,136 | 3/1972 | Schlitz et al. | 303/21 BE |
| 3,666,326 | 5/1972 | Marouby | 303/21 BE |
| 3,697,139 | 10/1972 | Elliott et al. | 303/21 P |
| 3,734,573 | 5/1973 | Davis et al. | 303/21 BE X |

Primary Examiner—Trygve M. Blix
Assistant Examiner—Stephen G. Kunin
Attorney, Agent, or Firm—Craig & Antonelli

[57] ABSTRACT

An installation for controlling the brake slippage in vehicle wheels, especially in motor vehicles, in which pulse transmitters are associated with the wheels whose pulses are processed by control circuits connected to the output of the transmitters into signals which act on control devices in the pressure medium circuits of the wheel brakes in such a manner that the pressure at the wheel brakes is selectively built up, held or decreased; apparatus is provided for the control of the recommencement of the pressure build-up which includes a time limit device and apparatus are also provided for influencing the pressure build-up which includes a timing generator producing an output pulse substantially immediately upon application of an input signal.

10 Claims, 2 Drawing Figures

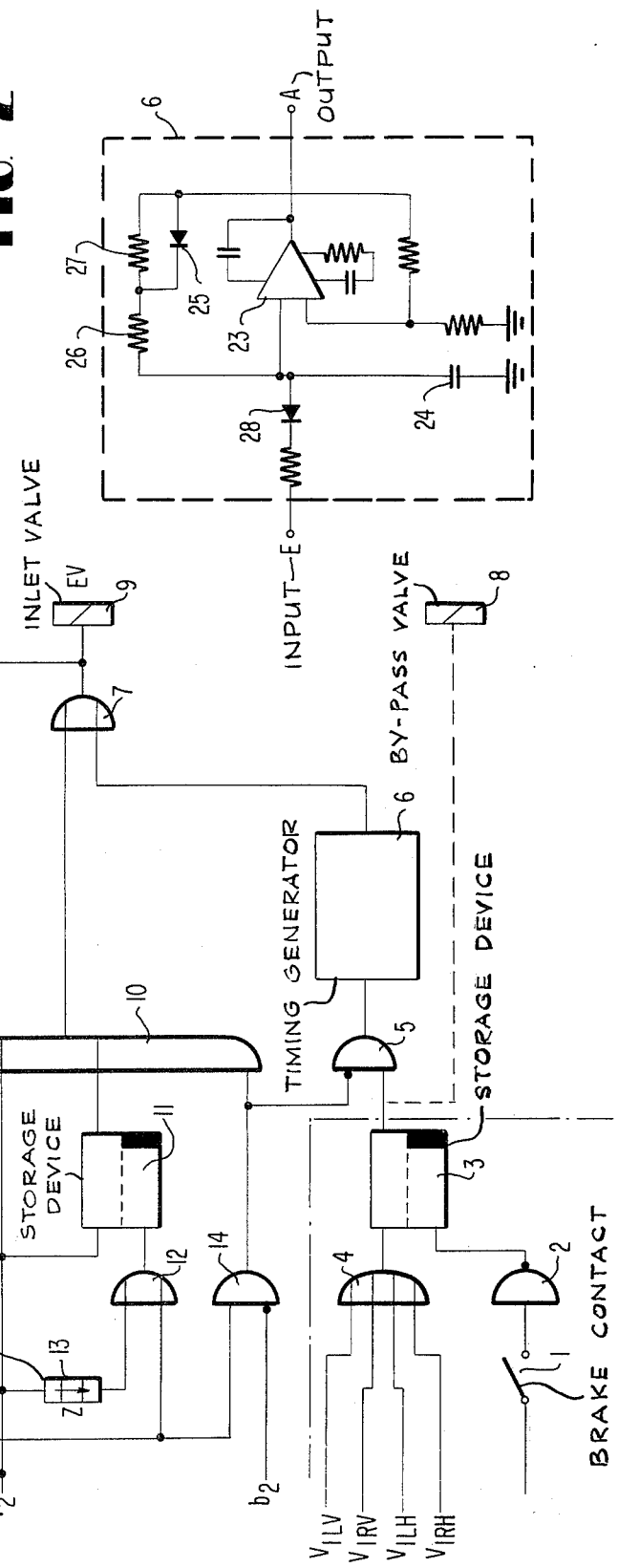

INSTALLATION FOR THE CONTROL OF THE BRAKE SLIPPAGE AND FOR THE PREVENTION OF THE LOCKING OF WHEELS OF VEHICLES, ESPECIALLY MOTOR VEHICLES

The present invention relates to an installation for controlling the brake slippage and for preventing the locking of wheels of vehicles, especially of motor vehicles, whereby pulse transmitters or generators are coordinated to the wheels, whose pulses are processed and possibly combined by a following control circuit into signals, which act on control devices in the pressure medium circuits of the wheel brakes in such a manner that the pressure at the wheel brakes is being built up, is being maintained or is decreased, and whereby means are provided for a control of the recommencement of the pressure build-up and means for an influencing of the pressure build-up.

It is favorable for the aimed-at shortest brake path or brake-distance to guide the wheel or the wheels with smallest possible velocity changes (control deviations) within the range of the slippage which is optimum in relation to the prevailing road condition. This is realized the better the more sensitive the detection and evaluation of the wheel acceleration.

The lower and upper acceleration and deceleration thresholds which can be obtained by conventional means as already known in the prior art and therefore of no special interest herein, are therefore set within tolerances or limits that are as narrow as possible, i.e., they are in part very close together. The interference magnitudes or variables resulting from the road condition which are superimposed on the acceleration and deceleration values, are eliminated in an also known manner by means of filters with integral time behavior or time characteristics.

Thus, a lower and an upper acceleration threshold $b_1$ and $b_2$, a lower and an upper deceleration threshold $V_1$ and $V_2$ as well as one or several slippage thresholds S are thus obtained in the prior art system.

It is determinative for a control of the wheel in question which is as sensitive as possible, that the actual wheel velocity deviates from the optimum wheel brake velocity as little as possible, i.e., that the wheel does not tend to lock immediately and its velocity remains as long as possible in proximity of the optimum slippage. By a rapid pressure decrease the locking is prevented and the wheel is accelerated again rapidly, however, in the brake control systems known heretofore one awaits in every case by subsequent holding action until the acceleration value falls below the threshold $b_1$ before the wheel is braked anew. Thereafter, it is necessary to build up the pressure again immediately when the signal therefor appears (falling below the acceleration threshold $b_1$). On the other hand, it is possible that the wheel after a sudden change of the road condition, for example, in case of an icy road or aqua-planing, is accelerated again only quite slowly and does not reach at all the threshold $b_1$ or only very late.

It is an aim of the present invention to prevent a far overshooting into the acceleration range, i.e., the acceleration phase should return the wheel again to its optimum velocity and should not accelerate the same too far beyond this optimum velocity, and in case of an excessively slow acceleration of the wheel should timely initiate the next pressure build-up.

The underlying problems are solved according to the present invention in that in particular in conjunction with acceleration thresholds within narrow tolerances, timing generators are used which, when the signal falls below the signal threshold $b_1$, begin immediately with a pulse and therewith with a pressure increase in the brake cylinder. This was possibly only accidentally in the prior art constructions. More particularly, the output of an astabile multi-vibrator was blocked or released by the signal $b_1$ by way of an AND-circuit. In the most unfavorable case, it was possible to begin with the pressure buildup only after awaiting the entire pulse interval or pause whereby the wheel was already accelerated to a greater extent than desired and more time was necessitated for the control and stabilization.

A time limit means is provided according to the present invention against an excessively slow pressure increase and therewith against an acceleration phase which lasts too long. It is proposed in that connection according to the present invention that the recommencement of the wheel deceleration after an acceleration operation, during which the first acceleration threshold would be reached only too late or not at all, is triggered by a timing circuit. In particular, this can be realized according to the present invention in such a manner that the register or memory device of any conventional construction which is set by the second deceleration threshold $V_2$ and which keeps the inlet valve closed, is again reset either by the first acceleration threshold $b_1$ or, when the latter is not reached after a predetermined time interval, by a timing circuit which is also set by the second deceleration threshold $V_2$.

A solution is preferred in the present invention, according to which the timing generator is formed by an operational amplifier which for achieving a predetermined timing or keying ratio between output and positive input, on the one hand, and output and negative input, on the other, is correspondingly connected and upon application of an input signal starts to run immediately with a pulse (FIG. 2). Of course, an equivalent circuit can also be realized with discrete circuit elements, such as for example, transistors.

Accordingly, it is an object of the present invention to provide a control system for controlling the brake slippage and for preventing the locking of the vehicle wheels which avoids with simple means the aforementioned shortcomings and drawbacks encountered in the prior art.

Another object of the present invention is a brake slippage and anti-locking control system for motor vehicle wheels which assures minimum velocity deviations of the wheels from the range of the optimum slippage in relation to the existing road condition.

A further object of the present invention resides in a control system for motor vehicles of the type described above which minimizes deviations of the actual wheel velocity from the optimum wheel velocity and which assures a rapid return of the wheel to optimum wheel brake velocity conditions.

A still further object of the present invention resides in a control system for controlling the brake slippage and preventing the locking of wheels of motor vehicles which prevents an excessive overshooting into the acceleration range during the acceleration phase of a wheel while initiating in proper time the pressure build-up in case of an excessively slow acceleration of the wheel.

Another object of the present invention resides in a control system of the aforementioned type which is simple in construction and utilizes relatively few parts of commercially available logic elements.

These and other objects, features and advantages of the present invention will become more apparent from the following description when taken in connection with the accompanying drawing, which shows, for purposes of illustration only, one embodiment in accordance with the present invention, and wherein:

FIG. 1 is a schematic circuit diagram of a control system for controlling the brake slippage and for preventing the locking of wheels in accordance with the present invention; and FIG. 2 is a schematic circuit diagram of one embodiment of a timing generator with associated pulse circuit in accordance with the present invention.

Referring now to the drawing, wherein like reference numerals are used throughout the two views to designate like parts, the logic circuit for one wheel of a motor vehicle is illustrated in FIG. 1. The part enclosed in dash and dot lines exists only once for the entire installation whereas the remaining circuit is required for each wheel to be controlled.

The required signals for slippage, acceleration- and deceleration-thresholds are obtained and fed to the illustrated circuit with the aid of pulse transmitters or generators (not shown) of conventional construction, for example, of frequency generators and conventional electronic control circuits connected to the output of these generators. Since these generators and circuits are known as such in the prior art, a detailed description and illustration thereof is dispensed with herein for the sake of simplicity.

During beginning of the brake operation, the brake contact 1 is closed, and the L-signal is received by the input of the storage or memory device 3 connected with the NOT-element 2. The pressure build-up in the brake cylinder of the controlled wheels can take place unimpairedly and rapidly corresponding to the pedal pressure since the inlet valve EV schematically indicated by its associated control relay 9 is not energized and therewith is open. The signal $V_1$ of each wheel detected and included in the control system, designated in FIG. 1 by $V_{1Lv}$ for the left front wheel, by $V_{1Rv}$ for the right front wheel, by $V_{1LH}$ for the left rear wheel and finally by $V_{1RH}$ for the right rear wheel, is fed to the OR-element 4. In this manner, the register or storage device 3 is set by the wheel which exceeds as the first one the threshold $V_1$. If only the front wheels are controlled, of course, only $V_{1Lv}$ and $V_{1Rv}$ have to be applied to the OR-circuit 4. As soon as the first wheel exceeds the threshold $V_1$, the register or storage device 3 is set by this signal by way of the OR-element 4 and any further pressure build-up in the course of this braking operation can take place only in a throttled manner either by keying or timing by means of the timing generator 6 or by a by-pass valve 8 or the like.

If the wheel in question now reaches itself the threshold $V_1$, then the inlet valve 9 is closed by way of the OR-element 10 and 7 and the pressure is maintained in the brake cylinder of this wheel.

If thereafter the signal drops below the threshold $V_1$, then the inlet valve 9 is again opened and in case of a missing signal $b_1$, the timing generator 6 is turned on by the NAND-elements 14 and 5 so that the pressure in the brake cylinder can increase immediately though only slowly.

If the wheel, in contradistinction thereto, is further decelerated and after the deceleration threshold value $V_1$ also the deceleration threshold value $V_2$ is exceeded, then the inlet valve 9 remains closed and the outlet valve AV schematically indicated by its associated control relay 18 is opened by the signal $V_2$ by way of the OR-element 16 and the AND-element 17 so that the pressure in the brake cylinder can decrease rapidly. Simultaneously, the register or storage device 11 is set by the signal $V_2$ and the timing element 13 is triggered. As long as the register or storage device 11 remains set, the inlet valve 9 remains closed. Due to the pressure decrease with an opened outlet valve 18, the wheel can accelerate again and drop below the threshold value $V_2$; as a result thereof, the outlet valve 18 is again closed so that the pressure is now held and the wheel is not accelerated excessively. Even after dropping below the value of $V_1$, the inlet valve 9 is continued to be kept closed by way of the register or storage device 11. Upon exceeding the first acceleration threshold $b_1$, the register or storage device 11 is erased by way of the OR-element 12. The signal $b_1$ reaches by way of the NAND-element 14 and the OR-elements 10 and 7 the inlet valve 9 so that the latter continues to remain closed.

In case that the wheel is accelerated for a longer period of time with an acceleration below the acceleration threshold $b_1$ because in the meantime possibly the friction value between wheel and road surface has strongly decreased (formation of ice), the timing element 13 adjusted to a predetermined operating time or running period, erases the register or storage device 11 by way of the OR-circuit 12, whereupon the inlet valve 9 is again opened and the timing generator 6 becomes operable by way of the NAND-elements 14 and 5 or that the pressure is immediately built up again slowly.

If, by reason of an excessive acceleration, the threshold $b_2$ is exceeded, then the NAND-element 14 is closed or blocked and the timing generator 6 is triggered by way of the NAND-element 5 which energizes by way of the OR-element 7 the inlet valve 9 for the pressure build-up. As a result thereof, the wheel is braked again. As soon as the signal drops thereby below the threshold value $b_2$, the inlet valve 9 is again closed and the pressure is held. If thereafter the signal continues to drop also below the threshold $b_1$, then the inlet valve is again keyed or suitably controlled (by way of the NAND-elements 14 and 5, the timing generator 6, and the OR-element 7) and pressure is being built up slowly. If the braking is thereby continued and the deceleration threshold or thresholds are possibly exceeded again, then the control cycle—as described above—commences anew. If the braking operation is terminated by releasing the brake pedal, then the opening brake contact 1 effects an erasing of the register or storage device 3 by way of the NOT-element 2. The pressure in the brake cylinder is thereby decreased due to the opened inlet valve 9.

Within the range between the values $b_1$ and $V_1$, the inlet valve 9 is closed by the reponse of the slippage threshold S by way of the NAND-element 15 and the OR-elements 10 and 7. Simultaneously, the discharge valve 18 is opened by way of the OR-element 16 as well as the AND-element 17 so that the existing pressure can be rapidly decreased. If subsequently the threshold $b_1$ is exceeded, the influence of the slippage signal is again eliminated thereby. The AND-element 17 is simultaneously a protective measure against an excessive rate of flow of pressure medium, for it prevents that the inlet and outlet valves are simultaneously opened for any reason.

The present invention prefers for the timing generator a solution according to FIG. 2. In this embodiment, the timing generator 6 is constituted by an operational amplifier 23 which is connected in such a known manner that it assumes the function of an astable multivibrator. The pulse duration and pulse interval are obtained by a change in the charge of the condenser 24 with different time constants (on the one hand by way of resistor 26, on the other by way of elements 26 and 27) in the direction of the respective output voltage. If the respective partial voltage at the positive amplifier input, dependent on the output voltage is exceeded by the condenser potential, then the output voltage flips over into the other condition.

If, however, a strongly negative potential is applied or appears at the input of the timing generator 6, then the condenser 24 forcibly remains discharged for such length of time (zero signal at the output) until a strong positive potential is again applied or appears at the input and the diode 28 as a result thereof carries out a blocking function. Since the first charge of the condenser 24 after the arrival of the input signal takes place by way of the diode 25 and the resistance 26, and only half of the change in charge voltage has to be reached, which takes place relatively rapidly, the pulse rise at the output commences almost immediately after the arrival of the input signal.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the control of the brake slippage of vehicle wheels, especially motor vehicle wheels, in which pulse transmitter means are coordinated to the wheels whose pulses are processed into signals in a circuit system connected to the output of the pulse transmitter means and in which the thus obtained signals act on control means in pressure medium circuit means of the wheel brakes in such a manner that the pressure at the wheel brakes is being built up, held or decreased, and which includes means for controlling the recommencement of the pressure build-up and means for influencing the pressure build up, characterized in that the means for controlling the recommencement of the pressure build-up includes time-limit means responsive to the attainment of a deceleration threshold value for enabling the recommencement of the pressure build-up within a predetermined period after the attainment of said deceleration threshold value unless an acceleration threshold value is attained within the predetermined period and in that the means for influencing the pressure build-up includes a timing generator means.

2. An installation according to claim 1 in which the timing generator means includes means operable upon application of a signal to its input to commence substantially immediately with a pulse rise in its output.

3. An installation according to claim 2, further comprising timing means operatively connected with the control means in such a manner that the recommencement of the wheel deceleration after an acceleration operation when the wheel acceleration does not exceed a first acceleration threshold value within the predetermined time period of the time-limit means is triggered by said time-limit means.

4. An installation according to claim 3, wherein said timing means includes storage means operable to be set by said deceleration threshold value which is a second deceleration threshold value, said storage means being operable to keep an inlet valve of the pressure medium circuit means of the corresponding wheel closed, said storage means being operable to be reset by the first acceleration threshold value or, in case said first acceleration threshold value is not reached after a predetermined time, being reset by said time-limit means which is also set by said second deceleration threshold value.

5. An installation according to claim 4, characterized in that the timing generator means includes an operational amplifier including circuit means for achieving a predetermined keying ratio between output and positive input on the one hand, and output and negative input on the other, said last-mentioned circuit means being operable to cause the operational amplifier to commence with the production of an output pulse substantially instantaneously with the application of an input signal.

6. An installation according to claim 5, wherein the circuit means of the operational amplifier includes a charging condenser and a charging circuit consisting of a series circuit having a series resistor and a parallel circuit consisting of a resistor and a diode series-connected with the first-mentioned resistor, the input being connected with said charging circuit by way of a rectifier means.

7. An installation according to claim 1, further comprising timing means operatively connected with the control means in such a manner that the recommencement of the wheel deceleration after an acceleration operation when the wheel acceleration does not exceed a first acceleration threshold value within the predetermined time period of the time-limit means is triggered by said time-limit means.

8. An installation according to claim 7, wherein said timing means includes storage means operable to be set by said deceleration threshold value which is a second deceleration threshold value, said storage means being operable to keep an inlet valve of the pressure medium circuit means of the corresponding wheel closed, said storage means being operable to be reset by the first acceleration threshold or, in case said first acceleration threshold value is not reached after a predetermined time, being reset by said time-limit means which is also set by said second deceleration threshold value.

9. An installation according to claim 1, characterized in that the timing generator means includes an operational amplifier including circuit means for achieving a predetermined keying ratio between output and positive input on the one hand, and output and negative input on the other, said last-mentioned circuit means being operable to cause the operational amplifier to commence with the production of an output pulse substantially instantaneously with the application of an input signal.

10. An installation according to claim 9, wherein the circuit means of the operational amplifier includes a charging condenser and a charging circuit consisting of a series circuit having a series resistor and a parallel circuit consisting of a resistor and a diode series-connected with the first-mentioned resistor, the input being connected with said charging circuit by way of a rectifier means.

* * * * *